US008248025B2

(12) United States Patent
Sip

(10) Patent No.: US 8,248,025 B2
(45) Date of Patent: Aug. 21, 2012

(54) CHARGING SYSTEM CAPABLE OF CHARGING ELECTRONIC DEVICE BY ELECTROMAGNETIC INDUCTION

(75) Inventor: Kim-Yeung Sip, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, New Taipei (TW)

( * ) Notice: Subject to any disclaimer, the term of this patent is extended or adjusted under 35 U.S.C. 154(b) by 356 days.

(21) Appl. No.: 12/436,099

(22) Filed: May 5, 2009

(65) Prior Publication Data
US 2010/0237827 A1  Sep. 23, 2010

(30) Foreign Application Priority Data
Mar. 19, 2009  (CN) .......................... 2009 1 0300962

(51) Int. Cl.
*H02J 7/00* (2006.01)

(52) U.S. Cl. ....................................................... 320/108

(58) Field of Classification Search .................. 324/108; D13/107, 108; 320/108
See application file for complete search history.

(56) References Cited

U.S. PATENT DOCUMENTS

| 5,917,307 | A  | * | 6/1999 | Watanabe et al. | 320/108 |
|---|---|---|---|---|---|
| 6,265,789 | B1 | * | 7/2001 | Honda et al. | 307/33 |
| 7,525,283 | B2 | * | 4/2009 | Cheng et al. | 320/108 |
| 7,683,572 | B2 | * | 3/2010 | Toya | 320/108 |
| 7,710,071 | B2 | * | 5/2010 | Elizalde Rodarte | 320/115 |
| 2008/0164840 | A1 | * | 7/2008 | Kato et al. | 320/108 |
| 2008/0197957 | A1 | * | 8/2008 | Kondo et al. | 336/90 |
| 2009/0015362 | A1 | * | 1/2009 | Okada et al. | 336/65 |
| 2009/0079386 | A1 | * | 3/2009 | Gallagher et al. | 320/108 |
| 2009/0096413 | A1 | * | 4/2009 | Partovi et al. | 320/108 |
| 2009/0212637 | A1 | * | 8/2009 | Baarman et al. | 307/104 |
| 2010/0164431 | A1 | * | 7/2010 | Sip et al. | 320/108 |

FOREIGN PATENT DOCUMENTS

| CN | 1479183 A | 3/2004 |
|---|---|---|
| CN | 101179208 A | 5/2008 |

\* cited by examiner

*Primary Examiner* — Jay Patidar
*Assistant Examiner* — David M. Schindler
(74) *Attorney, Agent, or Firm* — Altis Law Group, Inc.

(57) ABSTRACT

A charging system for charging a rechargeable battery in an electronic device includes a charging generator, a receiver and at least one magnetic core. The charging generator includes a first coil. The receiver includes a second coil magnetically coupled to the first coil, and a charging module electrically connecting the second coil to the rechargeable battery. The charging module is configured for charging the rechargeable battery using current induced in the second coil. The at least one magnetic core is sleeved by the first coil or by the second coil.

1 Claim, 4 Drawing Sheets

CHARGING SYSTEM CAPABLE OF CHARGING ELECTRONIC DEVICE BY ELECTROMAGNETIC INDUCTION

BACKGROUND

1. Technical Field

The present disclosure relates to charging systems, and particularly, to a charging system using electromagnetic induction and an electronic device.

2. Description of Related Art

Most portable electronic devices such as cellular phones, or laptop computers, are powered by rechargeable batteries. If the voltage of the battery, of a portable electronic device, such as a cellular phone, drops to a certain level, the device becomes unreliable and shuts down. Thus the battery must be recharged to a higher voltage level using a charging device before the portable electronic device can be used again.

To charge the battery, a charger is connected to a connector on the outer shell of the typical portable electronic device.

Repetitious plugging and unplugging of the charger connector with the connector of the portable electronic device degrades both the charger connector and the portable electronic device connector.

What is needed, therefore, is a charging system for a rechargeable battery in an electronic device to overcome the above-described problems.

DETAILED DESCRIPTION

Figure 1:
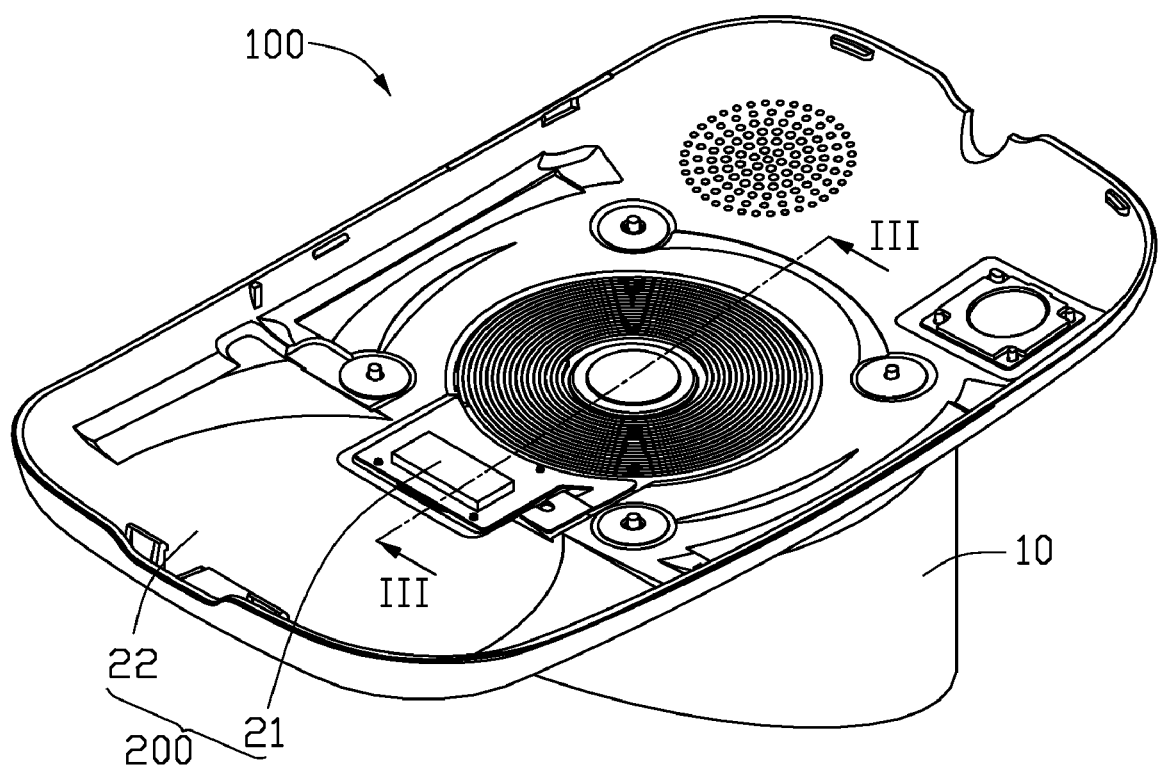
FIG. 1 is a schematic isometric view of a charging system according to an exemplary embodiment.
Figure 2:
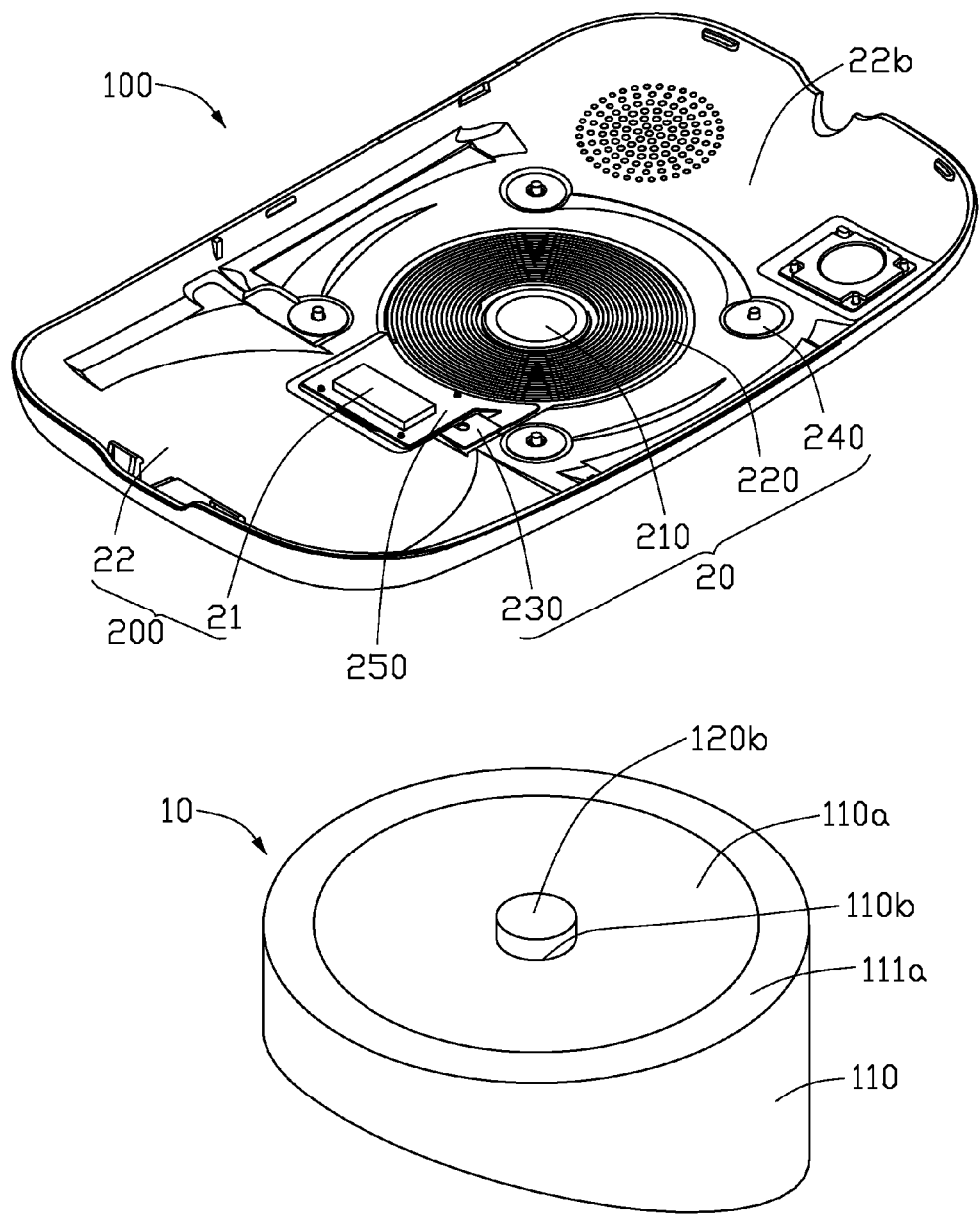
FIG. 2 is a partially dissembled schematic isometric view of the charging system of FIG. 1.
Figure 3:
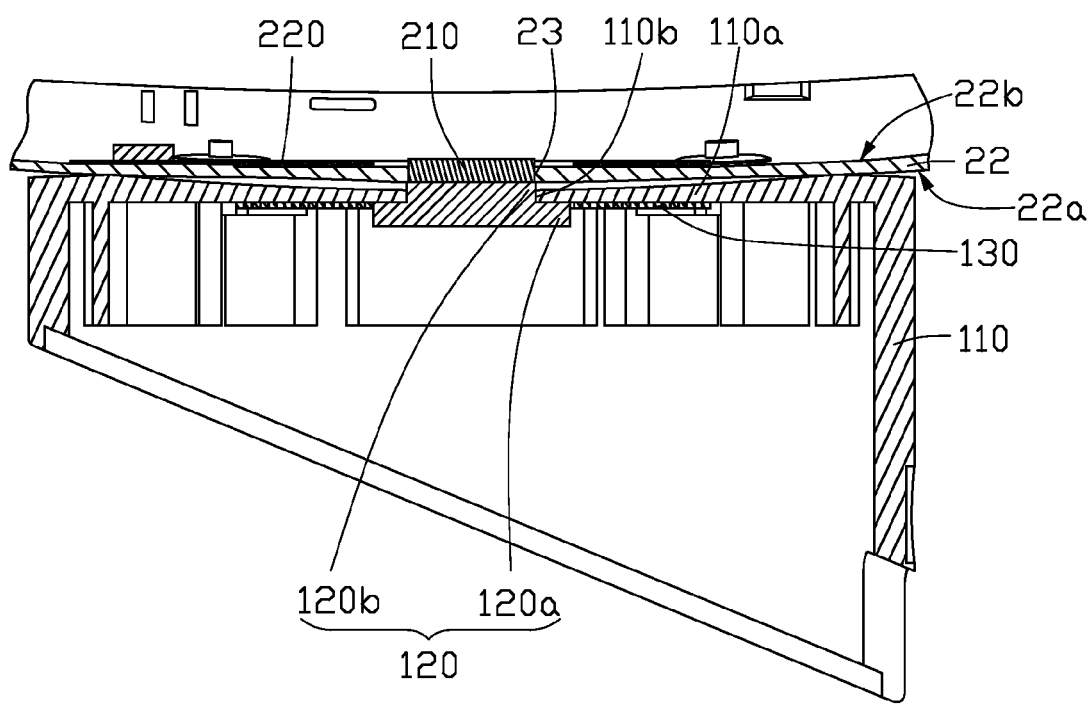
FIG. 3 is a cross-sectional view taken along line III-III of FIG. 1.

Referring to FIGS. 1-3, a charging system 100 for charging an electronic device 200, according to an exemplary embodiment, is shown. The electronic device 200 includes a rechargeable battery 21 and a cover 22. A first through hole 23 is defined in the cover 22. The charging system 100 includes a charging generator 10 and a receiver 20. The charging generator 10 is electrically connected to a power source (not shown) such as an alternating-current (AC) mains power outlet.

Figure 4:
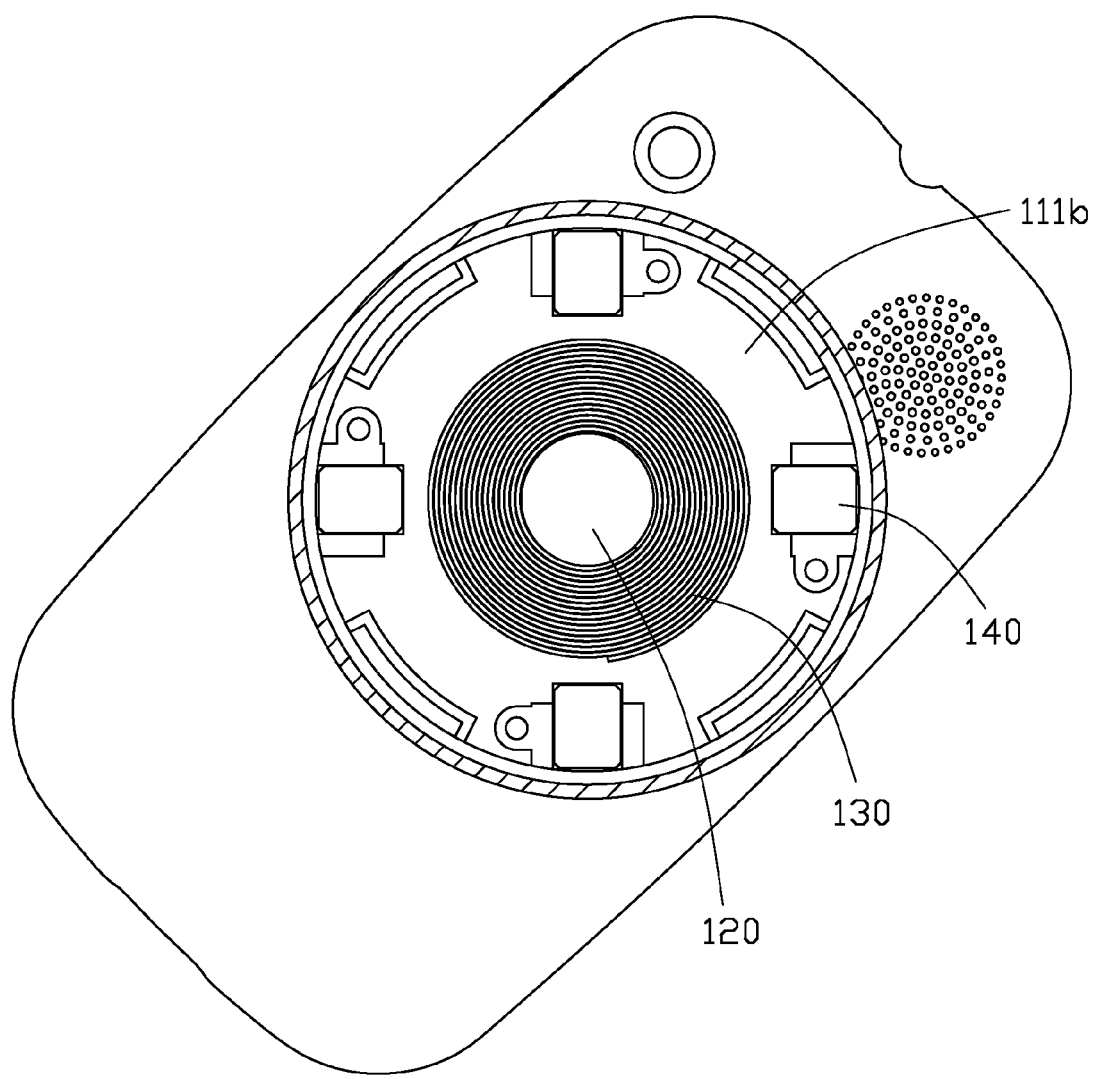
FIG. 4 is a horizontal cross-sectional view of the charging system of FIG. 1 with an electronic device in the charging position.

The charging generator 10 includes a housing 110, a first magnetic core 120, a first coil 130, and four first positioning portions 140 (see FIG. 4). The housing 110 may be made from plastic, and includes a central concave portion 110a at a top surface 111a of the housing 110. A second through hole 110b is defined in the central concave portion 110a, aligned with the first through hole 23. The first magnetic core 120 may be made from iron or nickel or other material suitable for a magnetic core. The first magnetic core 120 includes a disc-shaped body 120a, and a pole 120b extending perpendicularly from a central portion of the body 120a. The pole 120b is extended through the second through hole 110b and protrudes from the central concave portion 110a, as shown in FIGS. 2 and 3. Each first positioning portion 140 may be a magnet.

The first coil 130 may be made from copper and sleeved on the pole 120b of the first magnetic core 120. The first coil 130 is a planar spiral coil with a number of turns and substantially parallel to the body 120a. In this configuration, the height of the charging generator 10 can be reduced. The four first positioning portions 140 are attached to an inner surface 111b of the housing 110, each extending radially away from the first coil 130 and each adjacent first positioning portions 140 being an equal distance from each other.

The receiver 20 includes a second magnetic core 210, a second coil 220, a charging module 230, and four second positioning portions 240. The second magnetic core 210 may be made from iron or nickel or other material suitable for a magnetic core and is approximately rod-shaped and is fixedly received in the first through hole 23. An end surface of the second magnetic core 210 is coplanar with an outer surface 22a of the cover 22 and is exposed from the cover 22 so that the second magnetic core 210 is capable of contacting the first magnetic core 120 when the electronic device 200 is placed on the charging generator 10. The cover 22 may be assembled with the second magnetic core 210 by a double-shot molding process, which may enhance an assembling yield of the electronic device 200.

The second coil 220 may be made from copper, and is a planar spiral coil. The second coil 220 is attached to an inner surface 22b of the cover 22 and sleeved on the second magnetic core 210. The second coil 220 is magnetically coupled to the first coil 130. The second coil 220 is electrically connected to the charging module 230. The charging module 230 is electrically connected to the rechargeable battery 21. The charging module 230 is configured for charging the rechargeable battery 21 using current induced in the second coil 220. In this present embodiment, a flexible printed circuit board 250 is used for establishing electrical connections between the second coil 220 and the charging module 230, and between the charging module 230 and the rechargeable battery 21, which may reduce the weight of the electronic device 200.

The four second positioning portions 240 are fixed to the inner surface 22b of the cover 22, each being radially away from the second coil 220 and each adjacent second positioning portions 240 being the same distance from each other. Each second positioning portion 240 may be a ferrous block. When the electronic device 200 is placed on the generator 10, each first positioning portion 140 is capable of attracting each corresponding second positioning portion 240. Therefore, the second magnetic core 210 is quickly aligned with and firmly contacts the first magnetic core 120.

The charging system 100 works as follows: the electronic device 200 is placed on the housing 110, and the first coil 130 is activated by a power source, e.g., an alternating-current power source. Alignment and firm contact between the first magnetic core 120 and the second magnetic core 210 are quickly achieved since each first positioning portion 140 attracts each corresponding second positioning portion 240. A current is induced in the second coil 220 since the second coil 220 is magnetically coupled to the first coil 130. The charging module 230 charges the rechargeable battery 21 using the induced current.

It is to be understood that position and number of the first and the second positioning portions 140, 240 can be changed, depending on a practical use of the charging system 100.

The electronic device 200 can be charged using the charging system 100, by the second coil 220 magnetically coupled to the first coil 130. Therefore, plugging-and-unplugging procedure of external connectors is not needed, which enhances lifetime of both the charging generator 10 and the receiver 20.

Further, during charging of the rechargeable batter 21, the second magnetic core 120 is aligned with and firmly contacts the first magnetic core 210. As a result, the charging efficiency is further enhanced.

It is to be understood that, in another exemplary embodiment, the first magnetic core 120 and the second through hole 110*b* can be omitted. In a further exemplary embodiment, the second magnetic core 210 and the first through hole 23 can be omitted, as long as the second coil 220 is magnetically coupled to the first coil 130.

While certain embodiments have been described and exemplified above, various other embodiments will be apparent to those skilled in the art from the foregoing disclosure. The present disclosure is not limited to the particular embodiments described and exemplified, and the embodiments are capable of considerable variation and modification without departure from the scope of the appended claims.

What is claimed is:

1. A charging system for charging a rechargeable battery in an electronic device, the charging system comprising:

a charging generator comprising a first coil and a housing, the first coil being a planar spiral coil;

a receiver attached to an inner surface of a cover of the electronic device, and comprising a second coil magnetically coupled to the first coil, and a charging module electrically connecting the second coil to the rechargeable battery, the charging module configured for charging the rechargeable battery using current induced in the second coil, the second coil being a planar spiral coil; and a first magnetic core and a second magnetic core, the first magnetic core sleeved by the first coil and extending through the housing, the first coil being received in the housing, and the first magnetic core comprising a disc-shaped body and a pole extending perpendicularly from the disc-shaped body, the second magnetic core being sleeved by the second coil and fixedly received in a first through hole defined in the cover, and an end surface of the second magnetic core coplanar with an outer surface of the cover and exposed from the cover, the second magnetic core being aligned with the first magnetic core, wherein the housing comprises a central concave portion at a top surface thereof, and the pole extends from a second through hole defined in the central concave portion and protrudes from the central concave portion so that the first magnetic core is capable of contacting the second magnetic core.

* * * * *